(12) United States Patent
Liu

(10) Patent No.: US 8,498,107 B2
(45) Date of Patent: Jul. 30, 2013

(54) FIXING MECHANISM AND ELECTRONIC DEVICE HAVING THE SAME

(75) Inventor: Zhi-Hua Liu, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 382 days.

(21) Appl. No.: 13/027,283

(22) Filed: Feb. 15, 2011

(65) Prior Publication Data

US 2012/0057306 A1 Mar. 8, 2012

(30) Foreign Application Priority Data

Sep. 8, 2010 (CN) .......................... 2010 1 0275640

(51) Int. Cl.
*G06F 1/16* (2006.01)
*H05K 5/00* (2006.01)
*H05K 7/00* (2006.01)

(52) U.S. Cl.
USPC ..................................................... 361/679.37

(58) Field of Classification Search
USPC ........................................ 361/679.33–679.39
See application file for complete search history.

(56) References Cited

U.S. PATENT DOCUMENTS

| | | | |
|---|---|---|---|
| 6,256,194 B1 * | 7/2001 | Choi et al. | 361/679.58 |
| 7,447,013 B2 * | 11/2008 | Shi et al. | 361/679.33 |
| 7,656,654 B2 * | 2/2010 | Liu et al. | 361/679.33 |
| 8,064,208 B2 * | 11/2011 | Chen et al. | 361/747 |
| 2002/0071254 A1 * | 6/2002 | Tien | 361/727 |
| 2006/0126288 A1 * | 6/2006 | Chen et al. | 361/685 |
| 2006/0139871 A1 * | 6/2006 | Chen et al. | 361/685 |
| 2007/0274034 A1 * | 11/2007 | Yang et al. | 361/685 |
| 2008/0037212 A1 * | 2/2008 | Wang | 361/685 |
| 2008/0089022 A1 * | 4/2008 | Cheung et al. | 361/685 |

* cited by examiner

*Primary Examiner* — Adrian S Wilson
(74) *Attorney, Agent, or Firm* — Altis Law Group, Inc.

(57) ABSTRACT

A fixing mechanism for attaching a peripheral device to a housing of an electronic device includes a latching member, a locking rod, a locking member, a positioning member and a first resilient member. The latching member is fixed to the peripheral device. The locking member is mounted on the housing. The positioning member is fixed to the locking rod. The locking rod is slidably mounted on the locking member via the first resilient member. The first resilient member is elastically sandwiched between the positioning member and the locking member, and enabling the locking rod to be latched with or detached from the latching member. The electronic device having the fixing mechanism is also provided.

17 Claims, 6 Drawing Sheets

FIXING MECHANISM AND ELECTRONIC DEVICE HAVING THE SAME

BACKGROUND

1. Technical Field

The present disclosure relates to device attachment and, particularly, to a fixing mechanism for mounting a peripheral device to an electronic device.

2. Description of Related Art

An electronic device, such as a conventional notebook, a desktop computer, a server, or other, usually includes one or more storage devices, such as hard disk drives, compact disk read-only memory drives, digital video disc drives, floppy disk drives, and others. These electronic devices are typically employed to increase functionality of the electronic device.

A typical fixing mechanism for mounting a storage device to an electronic device includes a bracket, a storage device holder, and a plurality of fasteners. The electronic device, such as a host computer, includes a housing having a base and a sidewall. The bracket is fixed to the base of the housing, which is separate from the sidewall. The storage device holder includes two side frames, and a mounting protrusion extending upward from one of the side frames. The two side frames are opposite to each other. The storage device holder is disposed on the base and the mounting protrusion is fixed to the bracket by the fasteners. The storage device is fixed between the side frames by a plurality of fasteners. However, with ongoing developments in electronic devices, the availability of thinner configurations for electronic devices are gaining popularity. Thus, there may be insufficient space to disassemble the storage device by removing the fasteners, whereby disassembly of the storage device is troublesome and a risk of damaging other working elements of the electronic device is present.

Therefore, there is room for improvement within the art.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the fixing mechanism and electronic device having the same. Moreover, in the drawings like reference numerals designate corresponding parts throughout the several views. Wherever possible, the same reference numerals are used throughout the drawings to refer to the same or like elements of an embodiment.

DETAILED DESCRIPTION

Figure 1:
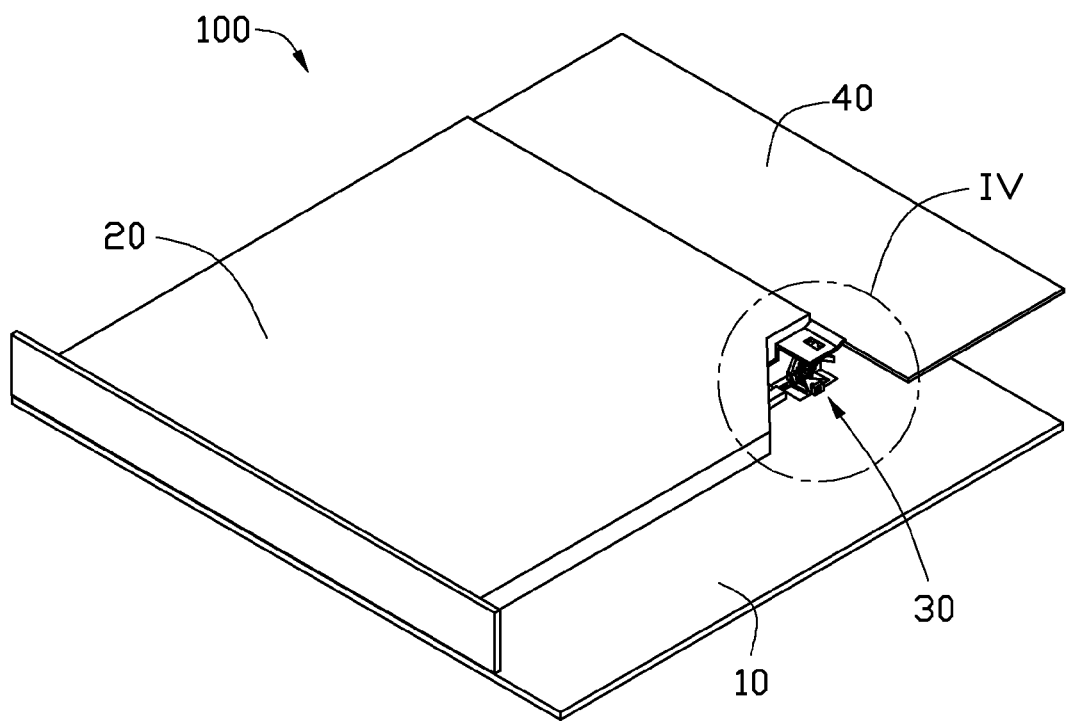
FIG. 1 is a partially assembled isometric view of an embodiment of an electronic device including a fixing mechanism.

Referring to FIG. 1, an embodiment of an electronic device 100 includes a housing 10, a peripheral device 20, a fixing mechanism 30 and a circuit board 40. The peripheral device 20 is detachably assembled to the housing 10 via the fixing mechanism 30 and is electrically connected with the circuit board 40, which is mounted above the housing 10 and adjacent to the peripheral device 20. The peripheral device 20 can be a hard disk drive, a compact disk read-only memory drive, a digital video disc drive, a floppy disk drive, or other. In the illustrated embodiment, the peripheral device 20 is a CD drive of a notebook computer.

Figure 2:
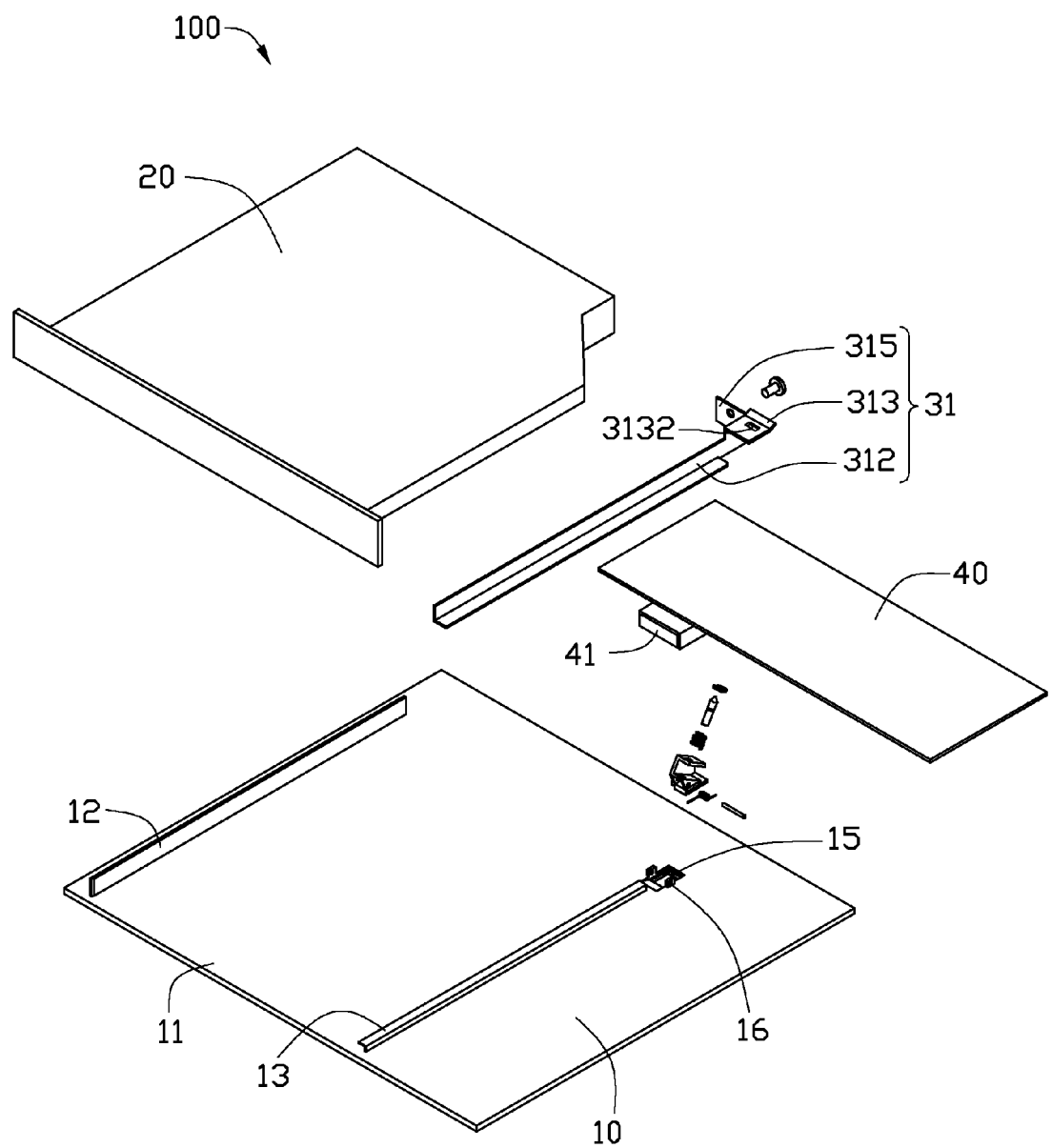
FIG. 2 is an exploded isometric view of the electronic device shown in FIG. 1.
Figure 3:
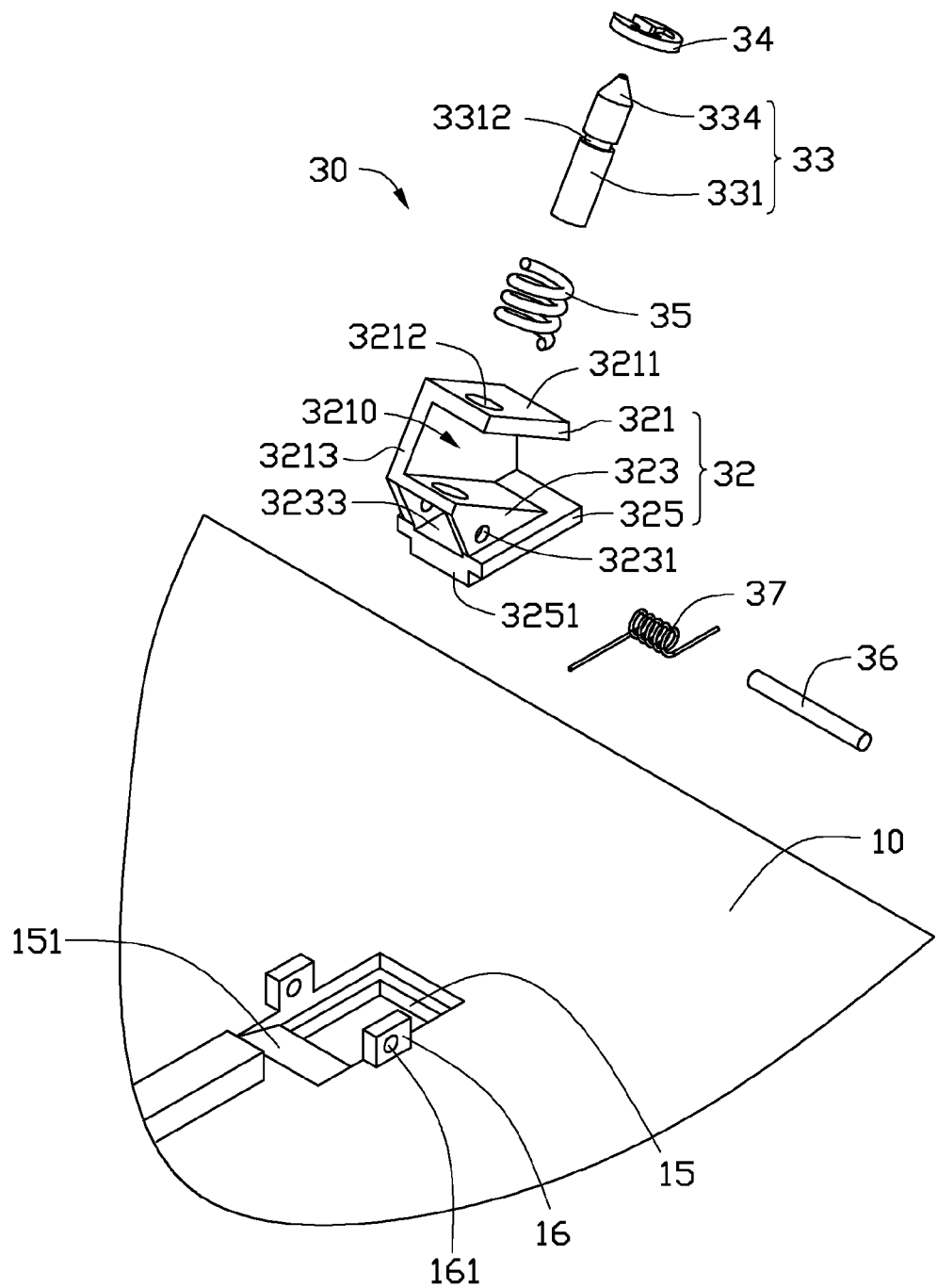
FIG. 3 is a partially enlarged, exploded isometric view of the electronic device shown in FIG. 1.

Also referring to FIGS. 2 and 3, the housing 10 includes a bottom plate 11, a first positioning piece 12 and a second positioning piece 13. The bottom plate 11 is a substantially rectangular board. The first positioning piece 12 and the second positioning piece 13 are separately formed on the bottom plate 11. The first positioning piece 12 and the second positioning piece 13 cooperatively form a receiving space (not labeled) together with the bottom plate 11, for receiving the peripheral device 20 therein. A stepped rectangular assembly hole 15 is defined through the bottom plate 11 and positioned adjacent to one end of the second positioning piece 13. The bottom plate 11 further defines an angled portion 151 at a side of the assembly hole 15 toward the center of the assembly hole 15 between the distal end of the second positioning piece 13 and the assembly hole 15. Two hinged blocks 16 are separately formed on the bottom plate 11 and oppositely positioned adjacent to two other opposite sides of the assembly hole 15. Each hinged block 16 defines a hinged hole 161.

The fixing mechanism 30 is used for fixing the peripheral device 20 to the housing 10. The fixing mechanism 30 includes a latching member 31 (see FIG. 2), a locking member 32, a locking rod 33, a positioning member 34, a first resilient member 35, a rotary shaft 36 and a second resilient member 37. The latching member 31 is fixed to the peripheral device 20. The locking member 32 is assembled to the housing 10 via the rotary shaft 36 and the second resilient member 37. The positioning member 34 is fixed to the locking rod 33. The locking rod 33 is slidably and releasably mounted on the locking member 32 via the first resilient member 35. The first resilient member 35 is elastically sandwiched between the positioning member 34 and the locking member 32, thereby enabling the locking rod 33 to latch with or detach from the latching member 31.

The latching member 31 includes a main body 312, a latching portion 313 and a fixing portion 315. The latching portion 313 and the fixing portion 315 are oppositely formed at a same end of the main body 312 and positioned at two sides of the main body 312. The latching portion 313 is substantially rectangular and extends out toward one side of the main body 312. A latching hole 3132 is defined through the latching portion 313 corresponding to the locking rod 33. The fixing portion 315 extends toward the opposite other side of the main body 312 to fix with the peripheral device 20.

The locking member 32 includes a locking portion 321, two connecting portions 323 and a base plate 325. The locking portion 321 is substantially U-shaped and includes two opposite sidewalls 3211 and a connecting wall 3213. The two opposite sidewalls 3211 and the connecting wall 3213 cooperatively form a U-shaped first receiving chamber 3210. The two sidewalls 3211 each defines an assembly hole 3212 opposite to each other and communicating with the receiving chamber 3210. The two connecting portions 323 are both substantially triangular and oppositely extend out from two side edges of one sidewall 3211 of the locking portion 321 away from the first receiving chamber 3210. Each connecting portion 323 defines a shaft hole 3231 therethrough. The base plate 325 is fixed with the two connecting portions 323 and partially fixed with one end of the sidewall 3211, such that the two connecting portions 323, the base plate 325 and the locking portion 321 cooperatively form a cuneiform (wedge-shaped) second receiving chamber 3233. A substantially rectangular convex plate 3251 is formed on a bottom surface of the base plate 325 corresponding to the assembly hole 15 of the housing 10, to facilitate the assembling of the locking member 32 to the housing 10.

The locking rod 33 includes a substantially cylindrical rod portion 331 and a substantially tapered locking portion 334 formed at one end of the rod portion 331. A substantially annular locking slot 3312 is recessed in from a substantial center of the rod portion 331.

In the illustrated embodiment, the positioning member 34 is a C-shaped clamp spring and latches into the locking slot 3312 of the locking rod 33. The first resilient member 35 is a compression coil spring sleeved on the locking rod 33 and received within the first receiving chamber 3210. The second resilient member 37 is a torsion spring sleeved on the rotary shaft 36 and received within the second receiving chamber 3233 of the locking member 32.

In assembly, the second resilient member 37 is received in the second receiving chamber 3233 of the locking member 32. The base plate 325 of the locking member 32 is engageably received in the assembly hole 15 of the housing 10. The rotary shaft 36 passes through the two shaft holes 3231 of the two connecting portions 323 and the second resilient member 37; two ends of the rotary shaft 36 are respectively hinged in the two hinged holes 161 of the hinged block 16. The first resilient member 35 is received in the first receiving chamber 3211 and coaxially aligned with the two assembly holes 3212 of the two sidewalls 3211. The rod portion of the locking rod 33 passes through one assembly hole 3212 of the locking portion 321 away from the base plate 325, the first resilient member 35, and is received in the other assembly hole 3212. The positioning member 34 is fixed to the locking slot 3312 of the locking rod 33 and positioned within the first receiving chamber 3210, resisting the inner side of the sidewall 3211, such that the locking rod 33 is elastically and releasably assembled to the locking member 32 via the first resilient member 35 and the positioning member 34. Accordingly, the first resilient member 35 is assembled within the first receiving chamber 3210 and is elastically sandwiched between the positioning member 34 and the other sidewall 3211 of the locking portion 321. The circuit board 40 is mounted above the housing 10 and positioned adjacent to the outer side of the second positioning piece 13. The circuit board 40 includes an electronic connector 41 mounted thereon for electrically connecting with the peripheral device 20 assembled within the receiving space of the housing 10.

Figure 4:
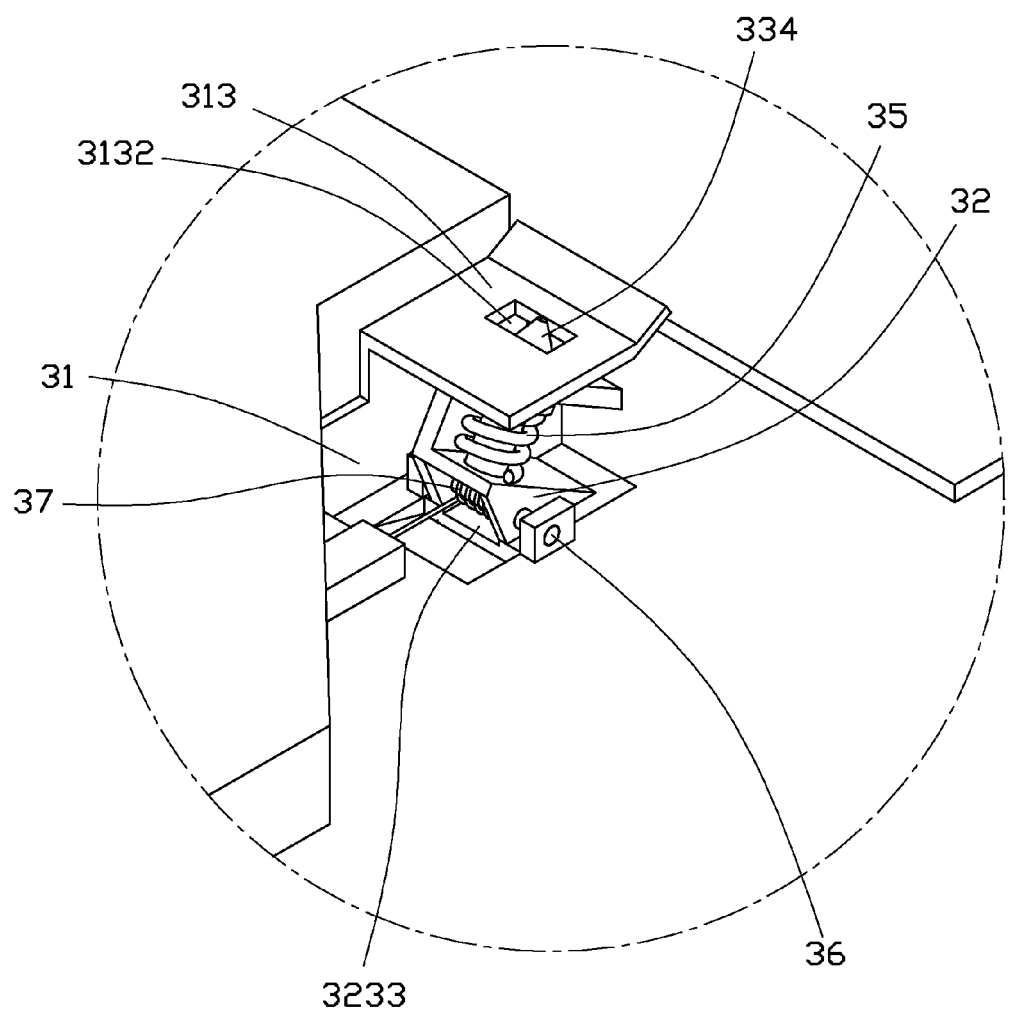
FIG. 4 is an enlarged view of a section IV of the electronic device shown in FIG. 1.

Also referring to FIG. 4, when assembling the peripheral device 20, the peripheral device 20 is placed on the bottom plate 11 of the housing 10 and positioned between the first positioning piece 12 and the second positioning piece 13. The peripheral device 20 is moved toward the second positioning piece 13 and the fixing mechanism 30. The latching portion 313 of the latching member 31 resists the distal end of the locking portion 334 of the locking rod 33. Meanwhile, the locking rod 33 is slid toward the bottom plate 11 of the housing 10, thereby compressing the first resilient member 35, until the locking portion 334 is received in the latching hole 3132 of the latching member 31 to complete the assembly of the peripheral device 20.

Figure 5:
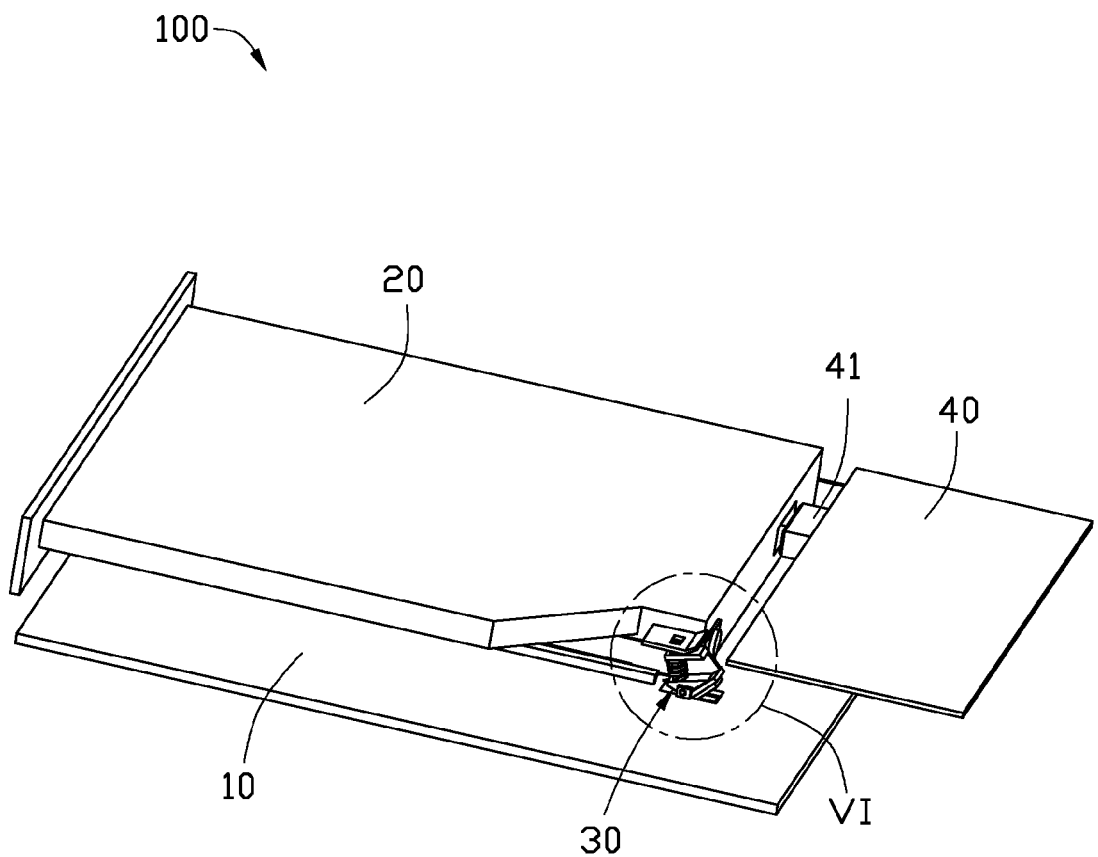
FIG. 5 is similar to FIG. 1, but viewed from another aspect and showing an unlocked state of the fixing mechanism.
Figure 6:
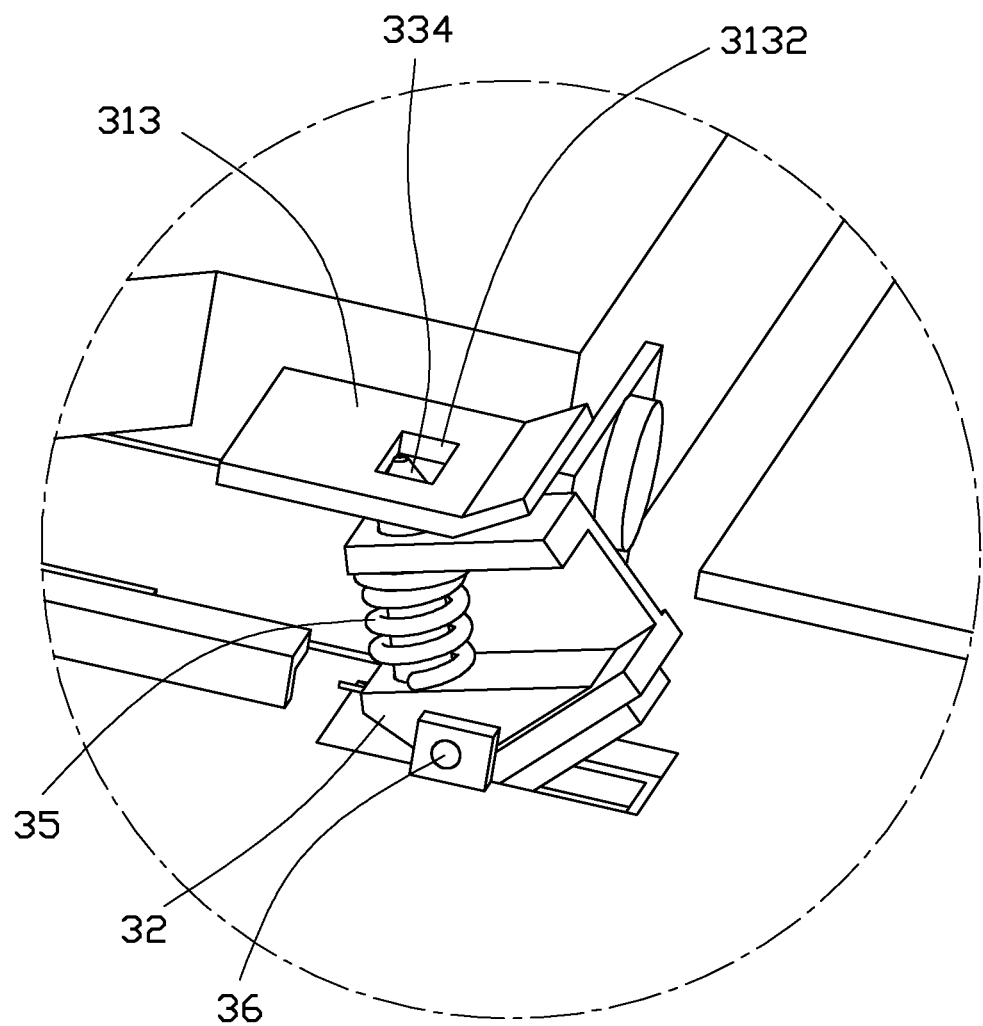
FIG. 6 is an enlarged view of the section VI of the electronic device shown in FIG. 5.

Referring to FIGS. 2, 5 and 6, during detachment of the peripheral device 20, the peripheral device 20 is moved away from the fixing mechanism 30 parallel to the first and second positioning pieces 12, 13. The locking member 32 is rotated together with the locking rod 33 relative to the housing 10 until the two connecting portions 323 of the locking member 32 resist the angled portion 151 of the assembly hole 15. Meanwhile, the second resilient member 37 is distorted to generate a return force for returning the locking member 32 to its original position automatically. After that, continued force maintains the peripheral device 20 away from the housing 10 until the locking portion 334 of the locking rod 33 disengages from the latching hole 3132 of the latching portion 313. The peripheral device 20 can be easily detached from the housing 10, and the locking member 32 returns to its original position via the second resilient member 37.

It is to be understood, however, that even through numerous characteristics and advantages of the disclosure have been set forth in the foregoing description, together with details of the structure and function of the present disclosure, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A fixing mechanism for fixing a peripheral device to a housing of an electronic device, the fixing mechanism comprising:
   a latching member fixed to the peripheral device;
   a locking member assembled to the housing;
   a locking rod slidably and releasably assembled to the locking member;
   a positioning member fixed to the locking rod; and
   a first resilient member elastically sandwiched between the positioning member and the locking member to provide an elastic force for enabling the locking rod to latch with the latching member or to detach from the latching member.

2. The fixing mechanism of claim 1, wherein the latching member comprises a main body, a latching portion formed at one side of the main body, and a fixing portion formed at the opposite other side of the main body; the fixing portion is fixed with the peripheral device, and the latching portion latches with the locking rod.

3. The fixing mechanism of claim 2, wherein the locking rod comprises a rod portion and a locking portion formed at a distal end of the rod portion, the latching portion defines a latching hole corresponding to the locking portion of the locking rod.

4. The fixing mechanism of claim 3, wherein the rod portion defines a annular locking slot adjacent to the locking portion, the positioning member is latched into the locking slot of the locking rod; and the first resilient member is sleeved on the locking rod and elastically sandwiched between the positioning member and the locking member.

5. The fixing mechanism of claim 3, wherein the locking member comprises a locking portion, the locking portion defines a first receiving chamber and comprises two opposite sidewalls, each sidewall defines an assembly hole communicating with the receiving chamber; the rod portion of the locking rod is slidably assembled to the locking portion via the first resilient member; the first resilient member is sleeved on the rod portion and received within the first receiving chamber.

6. The fixing mechanism of claim 5, wherein the locking member further comprises two connecting portions oppositely formed at a same end of the locking portion, the two connecting portions and the locking portion cooperatively form a second receiving chamber; the fixing mechanism further comprises a second resilient member and a rotary shaft, the second resilient member is sleeved on the rotary shaft and received within the second receiving chamber; the locking member is rotatably hinged to the housing via the rotary shaft and the second resilient member.

7. The fixing mechanism of claim 6, wherein the locking member further comprises a base plate fixed with the two connecting portions and partially connecting with the locking portion, and the housing defines an assembly hole for engaging with the corresponding base plate of the locking member.

8. An electronic device, comprising:
a housing defining a receiving space;
a peripheral device; and
a fixing mechanism for fixing the peripheral device within the receiving space of the housing of the electronic device, the fixing mechanism comprising:
a latching member fixed to the peripheral device;
a locking member assembled to the housing;
a locking rod slidably and releasably assembled to the locking member;
a positioning member fixed to the locking rod; and
a first resilient member elastically sandwiched between the positioning member and the locking member to provide an elastic force for enabling the locking rod to latch with the latching member or to detach from the latching member.

9. The electronic device of claim 8, wherein the housing includes a bottom plate, a first positioning piece and a second positioning piece, the first positioning piece and the second positioning piece are separately and parallelly formed on the bottom plate, and cooperatively form the receiving space together with the bottom plate for receiving the peripheral device.

10. The electronic device of claim 9, wherein the bottom plate defines an assembly hole positioned adjacent to the receiving space, and the locking member is rotatably assembled to the housing and partially received in the assembly hole.

11. The electronic device of claim 8, wherein the latching member comprises a main body, a latching portion formed at one side of the main body, and a fixing portion formed at the opposite other side of the main body; the fixing portion is fixed with the peripheral device, and the latching portion latches with the locking rod.

12. The electronic device of claim 8, wherein the locking rod comprises a rod portion and a locking portion formed at a distal end of the rod portion, the latching portion defines a latching hole corresponding to the locking portion of the locking rod.

13. The electronic device of claim 12, wherein the rod portion defines a annular locking slot adjacent to the locking portion, the positioning member is latched into the locking slot of the locking rod; the first resilient member is sleeved on the locking rod and elastically sandwiched between the positioning member and the locking member.

14. The electronic device of claim 13, wherein the locking member comprises a locking portion, the locking portion defines a first receiving chamber and comprises two opposite sidewalls, each sidewall defines an assembly hole communicating with the receiving chamber; the rod portion of the locking rod is slidably assembled to the locking portion via the first resilient member; the first resilient member is sleeved on the rod portion and received within the first receiving chamber.

15. The electronic device of claim 14, wherein the locking member further comprises two connecting portions oppositely formed at a same end of the locking portion, the two connecting portions and the locking portion cooperatively form a second receiving chamber; the fixing mechanism further comprises a second resilient member and a rotary shaft, the second resilient member is sleeved on the rotary shaft and received within the second receiving chamber; the locking member is rotatably hinged to the housing via the rotary shaft and the second resilient member.

16. The electronic device of claim 14, wherein the locking member further comprises a base plate fixed with the two connecting portions and partially connecting with the locking portion, and the base plate is received within the assembly hole of the housing.

17. The electronic device of claim 15, wherein the assembly hole is substantially stepped rectangular shaped and is positioned adjacent to one end of the second positioning piece; the assembly hole defines an angled portion toward the center of the assembly hole corresponding to the two connecting portions; the base plate further comprises a convex plate formed on a bottom surface thereof corresponding to the stepped assembly hole, for facilitating the locking member being assembled to the housing.

* * * * *